Dec. 10, 1929.  L. DURÁN Y DASPENAS  1,739,216
CLUTCH MECHANISM AND CHANGING OF SPEED
Filed June 4, 1927    3 Sheets-Sheet 1

INVENTOR.
Lorenzo Durán
y Daspenas

Dec. 10, 1929.  L. DURÁN Y DASPENAS  1,739,216
CLUTCH MECHANISM AND CHANGING OF SPEED
Filed June 4, 1927   3 Sheets-Sheet 2

INVENTOR.
Lorenzo Durán
y Daspenas

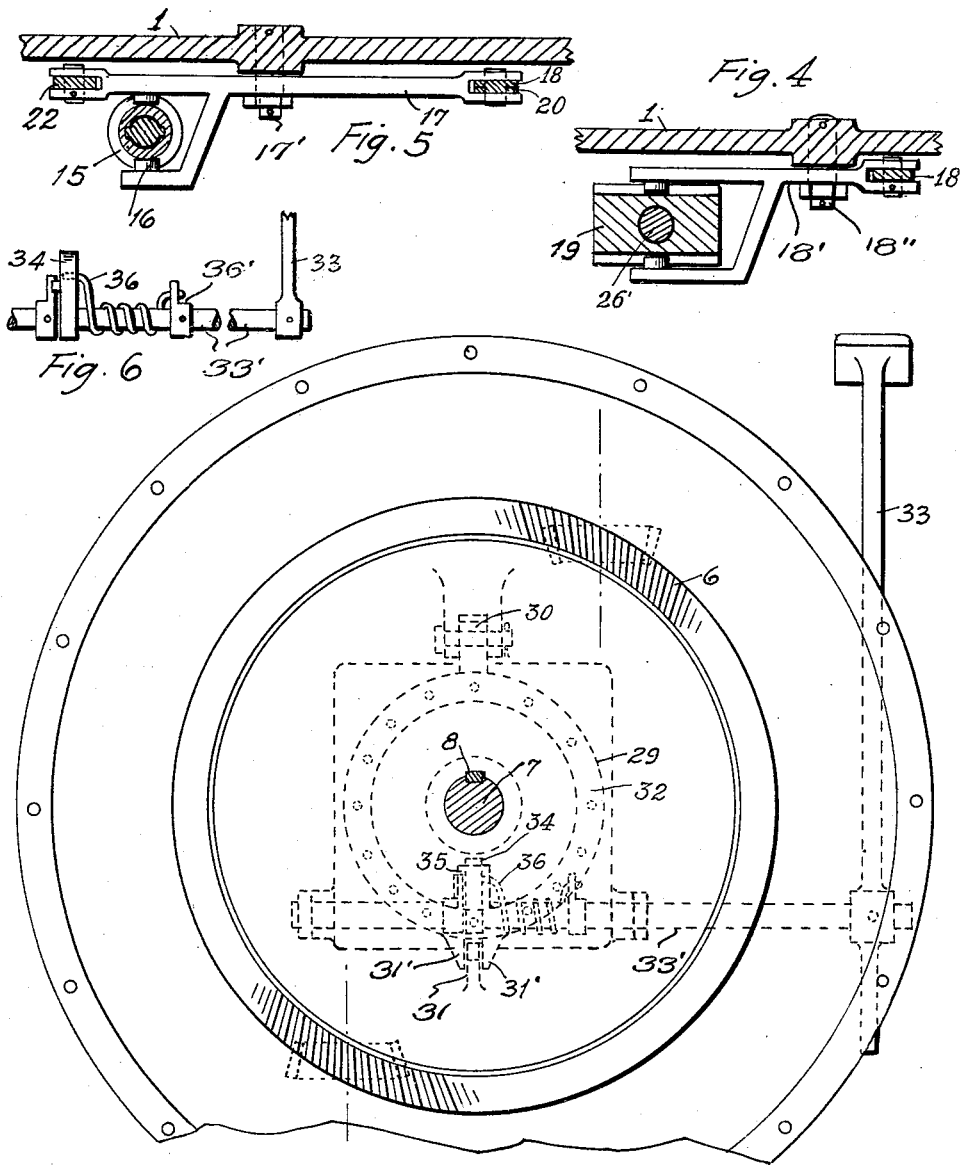

Patented Dec. 10, 1929

1,739,216

UNITED STATES PATENT OFFICE

LORENZO DURÁN Y DASPENAS, OF HABANA, CUBA

CLUTCH MECHANISM AND CHANGING OF SPEED

Application filed June 4, 1927. Serial No. 196,605.

This invention refers to a speed changing mechanism and its object is mainly to provide a mechanism of such kind entirely automatic in its operation, relieving the operator from the troubles of shifting successive gears and making the engagements and disengagements such as required today in the use and handling of automobiles.

Another object of the invention is to provide a mechanism that only requires the operation of the brake and accelerator pedals, all the operations pertaining to the changing of speed between the driving and driven axles being automatically made by means of such mechanism.

And another object of this invention is to provide a mechanism of such kind requiring less space and minor construction cost, more simple to handle and more durable than those actually known, and furthermore, working entirely without noise.

In the accompanying drawings

Fig. 3 is the same section on the line 2—2 of Fig. 1, looking from the right hand side of that figure.

Fig. 4 is a detailed section on the line 4—4 of Fig. 2.

Fig. 5 is a detailed section on the line 5—5 of Fig. 2.

Fig. 6 is a detail showing a longitudinal view of the pivoting shaft of the brake.

Figure 1:
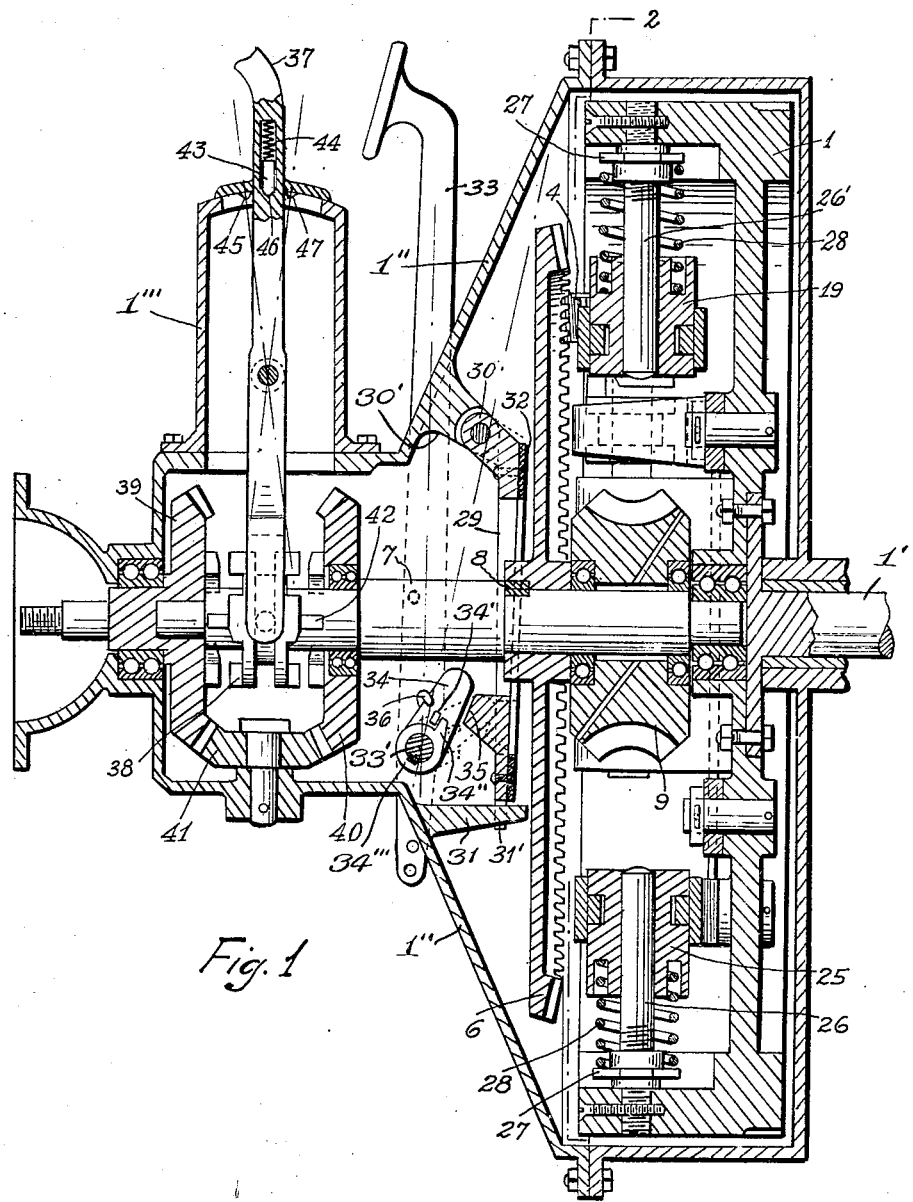
Fig. 1 is a diametral section of the mechanism.
Figure 2:
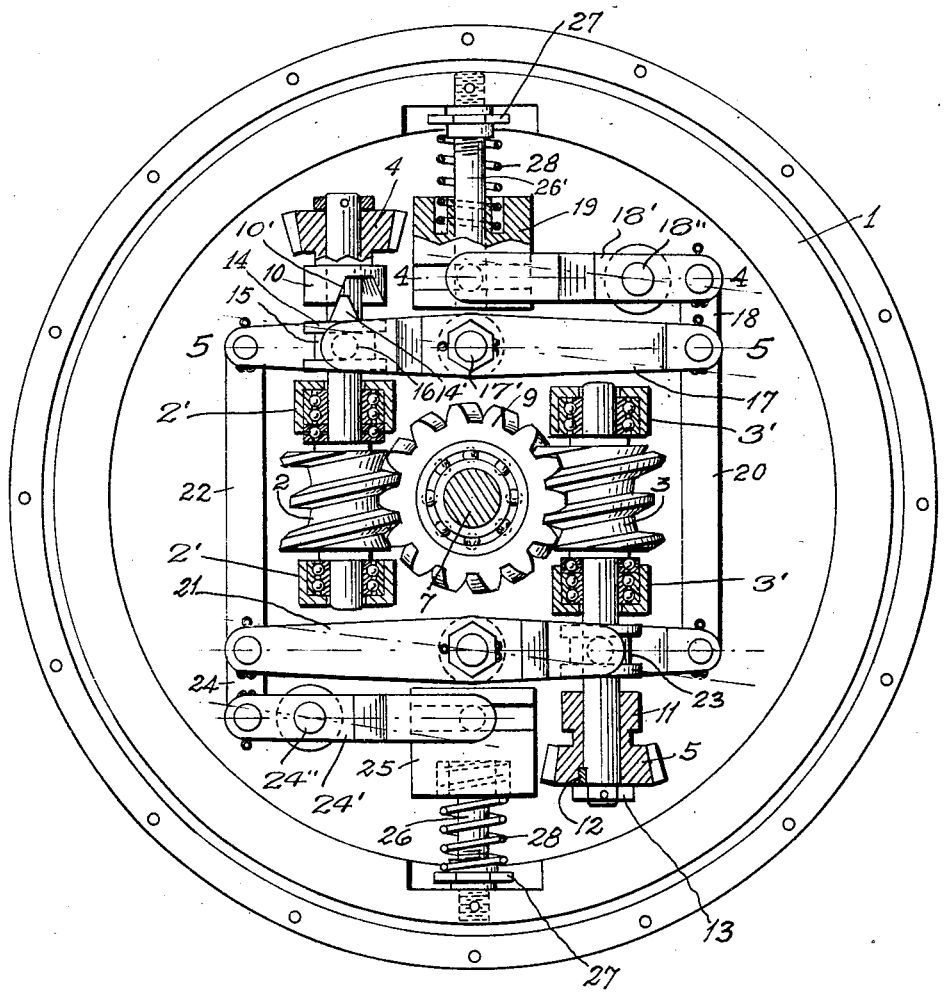
Fig. 2 is a section on the line 2—2 of Fig. 1 looking from the left of Fig. 1.

In the drawings, 1 indicates a flywheel, rigidly connected to the driving axle 1′, to which are annexed the bearings 2′ and 3′, pivotally supporting the shafts of the worms 2 and 3, parallelly arranged and bearing on their ends, respectively, the pinion 4, loosely mounted and the pinion 5, rigidly fixed by means of the wedge 12 and nut 13, said pinions being designed to engage the gear crown wheel 6, secured to the driven axle 7 by means of the wedge 8. On the shaft 7 is loosely mounted the worm wheel 9, which meshes with the worms 2 and 3.

The pinion 4 has integrally annexed a clutch member 10, provided with a notch or cut 10′ the sides of which are oppositely inclined and designed to always connect with a clutch member provided with a raised tooth 14′ of minor length than the notch or cut 10′, said clutch member carrying a wedge which allows it to be slidable on the shaft of worm 2, though rotating together with same. Said member 14 has an annular groove 15, into which play two pins 16, diametrally opposite and projecting from two opposite branches formed at the same end of a lever 17, pivotally mounted at 17′ on the body of the flywheel 1. This lever is connected at its other end and by means of a connecting rod 18 with a lever 18′ pivotally mounted at 18″, on the body of flywheel 1 and on the other end has a forked end with a double pin and annular groove connection, with a counterweight 19, slidably mounted on a stem 26′, fixed in radial position on the annular flange of the flywheel 1, there being a spring 28, coiled around the stem 26′, one end of said spring resting in an annular cavity formed in the extreme end of the counterweight 19 and the other end against a nut 27, screwed on the threaded portion of the stem 26′ and regulating the tension of the spring 28.

The lever 17 is connected by means of a connecting rod 20 with a forked lever 21, similar to the lever 17 and pivotally mounted at 21′ in the opposite side to the center of the flywheel 1 and which is connected, by means of a double pin and annular groove connection, with a cylinder 23, slidably mounted on the shaft of the worm 3, said member 23 being designed to maintain the equilibrium with reward to the clutch member 14 and at the same time, the other end of the lever 21 is connected by means of a connecting rod 22 with the opposite end of the lever 17. The same end of the lever 21 is connected, by means of a connecting rod 24, with the other end of lever 24′, similar to lever 18′, and pivotally mounted at 24″, on the body of the flywheel 1 and having a double stem and circular groove connection with a counterweight 25, similar to counterweight 19, slidably mounted in another stem 26, similar to the stem 26′ first described and mounted in a way similar on or over the flange of the flywheel 1, the two counterweights 19 and 25 being in diametrally opposite positions.

Connected to the pinion 5 as an integral portion of same is a stablizer cylinder 11, for equalizing the weight of the clutch member 10.

Around the driven axle 7 is placed a brake band 29, articulated by means of the arm 30 to the supporting fork 30', projecting inwardly from the cover 1'' of the mechanism, there being a circular band of camel hide 32 connected to the brake band 29 in order to frictionally act upon the gear crown wheel 6. In its motion, the brake band is moved by means of a guide 31, projecting inwardly from the cover 1'' and on which advances a forked projection 31', abutting from the brake band 29. The motion is imparted to the brake band 29 by means of an arm 34 designed to engage an abutment 35 of the brake band 29 and loosely mounted at the end of a horizontal shaft 33', rotatably mounted through the cover 1'' and carrying on its outside end the pedal bar 33, there being a coil spring 36 wound around the shaft 33', said spring resting by a curved end thereof against the arm 34 and at the other end against an abutment formed on a collar 36' fixed to the shaft 33', the arm 34 being retained in position by means of a detent 34', projecting from same and acting against a detent 34'' projecting from a collar 34''', fixed to the shaft 33'. Thus, when the brake band 29 is not operated, the same is held separated from the gear crown wheel 6. Upon the driven axle 7 is slidably mounted a coupling 38 designed to act for the forward motion or the rearward motion respectively, upon one of the two beveled gear wheels 39 and 40, meshing at the same time with the beveled gear pinion 41 loosely mounted on the cover 1''. The clutch member 38 is connected to the shaft 7 by means of the key 42 and said member 38 is operated by a forked lever 37, pivotally mounted on a casing 1''', annexed to the cover 1'' and said lever 37 carries a pin 43, operated by the spring 44 and arranged to connect with one of the three grooves or recesses 45, 46 or 47 of the casing 1''', at will, and place the clutch 38 in position of forward, neutral or rearward run.

The operation of this mechanism is as follows:

Once the motor started, whereby the flywheel 1 rotates carrying the worms 2 and 3 which by means of the pinions 4 and 5 impart motion to the gear crown wheel 6, due to the fact that the lever 37 has been placed in neutral position, the pedal 33 is acted so as to brake the car, and said pedal, by means of the arm 34, tightens the brake band 29 against the gear crown wheel 6, until same is stopped, so that the pinions 4 and 5 roll over same with the worms 2 and 3, which, in their turn, rotate the worm wheel 9. The lever 37 is then acted upon forward to set the forward run upon the teeth of the clutch or coupling 38 engaging those of the beveled gear wheel 39. Then the pedal 33 is released, the motor accelerated and then, upon reaching a certain speed, the counterweights 19 and 25 will commence sliding towards the periphery of the flywheel 1, yielding to the centrifugal force when the same overcomes the tension of springs 28 and upon the clutch members 10 and 14 tending to separate, due to the pressure exerted between the tooth of the member 14 and the groove side of member 10, by virtue of the force of inertia. The motion effected by the counterweights 19 and 25 is transmitted by levers 18' and 17, 24' and 21, to the clutch member 14, forcing the tooth 14' still deeper into the inclined side groove 10' of member 10, thus producing an advance in the rotation of the worm 2 and therefore, an increase in the resistance to the rotation of both worms 2 and 3 in regard to the worm wheel 9, braking this one and reducing the speed of rotation of the pinions 4 and 5, which will start to rotate the gear crown wheel 6, thus initiating the rotation of the driven axle 7 and the motion of the car. Once the car is underway, due to the force of inertia, the pressure exerted between the tooth 14' of the clutch member 14 and the groove 10' of the member 10 diminishes, therefore diminishing the force exerted by both members to separate, thus favoring or helping the separation of the counterweights 19 and 25 towards the periphery of the flywheel 1. Thus, the speed of rotation of the gear crown wheel 6 increases, and with it, that of the driven axle 7 and that of the automobile.

Since the tension of the coil springs 28 and force of inertia act directly against the centrifugal force at any moment that the speed of the driving axle is reduced, the centrifugal force acting upon the counterweights 19 and 25 will also diminish, these counterweights receding and this motion being imparted by means of the levers 18' and 17, 24' and 21, to the clutch member 14, the tooth 14' of which will slide away from the groove 10' of the member 10, decreasing the advancement of worm 2 and evening, therefore, the rotation of both worms 2 and 3 with regard to the worm wheel 9, thereupon the pinions 4 and 5 do not pull the gear crown wheel 6 in going about the latter which will reduce its speed, also that of the driven axle 7.

When the motion of the car is desired to stop, there is nothing else to do but release the accelerator pedal and operate pedal 33, with which the car will be braked. Upon reducing the speed of the driven axle, the counterweights 19 and 25 will recede to their normal maximum limit, which will cause the free rotation of the pinions 4 and 5 upon the gear crown wheel 6, shortly before the automobile comes to a stop. Once the speed of the car is checked, the brake pedal may be released if the car is not on a grade, because in order to start the car again it is necessary to push down on the accelerator pedal to impart to the motor its required speed.

According to the explanations above, the engagement and disengagement or shifting of gears is effected without the use of levers or clutches, as usually done today with mechanisms in actual use for changing speeds.

When the car is going down hill, the speed of the motor is reduced and will serve same as a brake, the disconnection being impossible because the pinion 5 cannot rotate being prevented from so doing by worm 2, which cannot be operated by pinion 4, on account of the cut 10′ being larger than the tooth 14′ offering to it sufficient space for escaping engagement.

Several changes may be made in the form of the invention, without departing from the spirit of same, such as expressed in the appended claims.

What I claim is:

1. In speed changing mechanism, a driving axle, a driven axle, a fly wheel secured to the driving axle, a crown gear wheel fixed to the driven axle, means to brake the crown gear wheel, a set of counterweighted gear members rotatably mounted on the body of the fly wheel and meshing with said crown gear, counterweights mounted on the body of the fly wheel for radial movement, springs to move said counterweights toward the driving shaft and connecting means between the counterweights and the counterweighted gear members for varying the speed of rotation of said gear members in regard to each other and producing the pull of the crown gear fixed to the driven axle.

2. In speed changing mechanism, a driving shaft, a driven shaft, a fly wheel secured to the driving shaft, a crown gear fixed to the driven shaft, means to brake the crown gear, a set of counterweighted gear members rotatably mounted on the body of the fly wheel and meshing with the crown gear, counterweights mounted on the body of the fly wheel for radial movement, springs to move said counterweights toward the driving shaft, and connecting means between the counterweights and the weighted gear members for varying the rotation of said gear members in regard to each other and producing the pull of the crown gear attached to the driven shaft.

3. In speed changing mechanism, a driving shaft, a driven shaft, a fly wheel fixed to the driving shaft, a crown gear fixed to the driven shaft, spring actuated means to brake said crown gear, a set of two worms revolubly mounted on the body of the fly wheel and opposite said crown gear, a worm wheel engaging said set of worms and loosely mounted on the driven shaft, a loosely mounted pinion and a fixed pinion carried respectively on the ends of the shafts of the two worms and meshing with the crown gear, said loosely mounted pinion having a clutch member provided with a groove the sides of which are steeply inclined, counterweights mounted on the body of the fly wheel for radial movement, springs to move said counterweights toward the driving shaft, a clutch member slidably mounted on the shaft of the loosely mounted pinion and having a tooth arranged to slide against the notch of the first named clutch member, a counterweight cylinder slidably mounted on the shaft of said fixed pinion, sets of levers connecting the spring pressed counterweights to one of the slidable members on the shafts of the free and fixed pinions, so that upon sliding the tooth of the clutch member against a notch of the free pinion the rotation of the two worms is varied with regard to the intermediate worm wheel and the pull of the crown gear fixed to the driven shaft effected.

LORENZO DURÁN Y DASPENAS.